(12) United States Patent
Engst

(10) Patent No.: US 6,246,574 B1
(45) Date of Patent: Jun. 12, 2001

(54) SUB-ASSEMBLY FOR AN ASSEMBLY SYSTEM

(75) Inventor: Ernst Engst, Unterschleissheim (DE)

(73) Assignee: Océ Printing Systems GmbH, Poing (DE)

( * ) Notice: Subject to any disclaimer, the term of this patent is extended or adjusted under 35 U.S.C. 154(b) by 0 days.

(21) Appl. No.: 09/284,823

(22) PCT Filed: Oct. 21, 1997

(86) PCT No.: PCT/DE97/02443

§ 371 Date: Jun. 9, 1999

§ 102(e) Date: Jun. 9, 1999

(87) PCT Pub. No.: WO98/18129

PCT Pub. Date: Apr. 30, 1998

(30) Foreign Application Priority Data

Oct. 22, 1996 (DE) .............................. 196 43 613

(51) Int. Cl.$^7$ ................... G06F 1/16; H05K 5/02
(52) U.S. Cl. ............................ 361/685; 361/724
(58) Field of Search .................. 361/679, 683, 361/684, 685, 724, 730, 727, 752, 686

(56) References Cited

U.S. PATENT DOCUMENTS

| | | |
|---|---|---|
| 4,370,687 | 1/1983 | Shiraishi et al. . |
| 5,038,308 | * 8/1991 | Le et al. ........................... 364/708 |
| 5,136,466 | 8/1992 | Remise et al. . |
| 5,195,022 | * 3/1993 | Hoppal et al. .................... 361/391 |
| 5,214,567 | 5/1993 | Feightner et al. . |
| 5,566,049 | * 10/1996 | Nguyen ............................. 361/685 |
| 5,566,383 | 10/1996 | Gildea et al. . |

FOREIGN PATENT DOCUMENTS

| | | |
|---|---|---|
| 88 12 270 U | 2/1989 | (DE) . |
| 93 05 272 U | 8/1993 | (DE) . |
| 0 020 176 | 12/1980 | (EP) . |
| 0 069 545 | 1/1983 | (EP) . |
| WO 90/06580 | 6/1990 | (WO) . |

OTHER PUBLICATIONS

Catalog for Schroff, Jun. 1993, p. 36.20.

* cited by examiner

Primary Examiner—Lynn D. Feild
(74) Attorney, Agent, or Firm—Schiff Hardin & Waite

(57) ABSTRACT

A sub-assembly for assembled systems has a front plate with two sections, with each section having a standard front height and a standard front width and each section having a disk drive. The assembly also has a common supporting plate extending vertically from the front plate on which the two disk drives are mounted offset with the back surface of each disk drive facing in an opposite direction with the disk drive having the back surface facing the front panel being spaced therefrom to form a space for connecting lines extending from plug connectors on the front panel that extend to the connectors on the back surfaces of each disk drive.

14 Claims, 2 Drawing Sheets

SUB-ASSEMBLY FOR AN ASSEMBLY SYSTEM

BACKGROUND OF THE INVENTION

The invention is directed to an assembly for a building block system having a minimal standard front height and a minimal standard front width, whereby the assembly is composed of at least two sections that have a shared front panel and a shared carrier plate, whereby the front height and the front width of each section correspond to the minimal standard front height or, respectively, to the minimal standard front width.

Internationally standardized building block systems for electrical systems such as, for example, the inch-based building block system ES902C of Siemens AG or similar systems contain an assembly carrier with standardized dimensions into which corresponding assemblies can be inserted next to one another.

Such an assembly normally contains a front panel and a principal printed circuit board vertically connected to the front panel on which the electrical and electronic components of the assembly are secured and that can be inserted into standardized guide rails in the assembly carrier. What is understood below by an assembly is not only a traditional assembly having one or more printed circuit boards but also a rack for mounting electrical or electronic components or devices that mates with the building block system and can be inserted there into.

The height of the assembly carrier and the assemblies appertaining thereto as viewed from the front side is generally a whole multiple of a minimal standard front height, and the width of an assembly is a whole multiple of a minimal standard front width. In a widespread type of building block systems, the front height is recited in height units, whereby a height unit amounts to 44 mm and the minimal standard front height amounts to 3 height units or 132 mm. The front width is recited in division units, whereby a division unit amounts to 5.8 millimeters and the standard front widths amount to one or more division units. A standard front width that approximately corresponds to the thickness of a disk drive or, respectively, something larger is referred to here as minimum standard front width even though it can also be smaller in other applications. Eight division units or 40.64 mm are generally adequate for commercially available hard disk or moving head disk drives.

An individual assembly with an individual front panel and an individual principal printed circuit board can have a width of several standard front widths. In addition, given a corresponding height of the assembly carrier, it can have a height of a plurality of minimal standard front heights, so that the principal printed circuit board is to be designed correspondingly larger. Such an assembly having a plurality of standard front widths and/or a plurality of minimal standard front heights can be imaged as being composed of a plurality of elementary sections, each of which respectively has the standard front dimensions and that vertically or, respectively, horizontally adjoin one another.

In some instances, it is desirable that a device, for example for the control of an electrical system, that is realized on the basis of such a control system contains one or more disk drives, for instance a hard disk drive and a moving head disk drive such as a floppy disk drive. Commercially obtainable disk drives, however, cannot be integrated without further ado into the standardized building block system for electrical systems, so that such a disk drive hereinbefore had to be mounted either outside the building block system or within the building block system in an expedient way.

DE 93 05 272 U1 discloses a pluggable periphery box that contains a hard disk drive and a moving head disk drive. The two drives are mounted at a distance from one another. The interspace between the drives serves for the acceptance of a connector means in order to electrically connect the drives to a base plate.

The catalog of the Schroff Company, 6/93 Edition, page 36.20, describes standard electronics housings that have inserts for drives. The drives are arranged in transverse format and each respectively have a printed circuit board.

DE 88 12 270 U1 describes an electronics housing for the acceptance of electro mechanical data processing modules. The individual modules can be inserted into the housing with guide rails.

U.S. Pat. No. 5,214,567 describes an assembly that contains two disk drives. These disk drives are respectively mounted at an end of the assembly lying opposite one another.

U.S. Pat. No. 5,566,383 discloses an assembly wherein two disk drives are arranged on a single carrier plate. The disk drives can be at a distance from the front panel.

The connecting lines for the two disk drives are arranged at the back end of the carrier plate and point in the same direction.

SUMMARY OF THE INVENTION

An object of the invention is to integrate the disk drives in a building block system in a simple, mechanically stable and space-saving way.

This object is obtained by an assembly for a building block system with at least two sections that have a common front panel and a common carrier plate which extends perpendicular to the front panel, the front height and front width of the panel in every section is at least equal to a minimal standard front height and minimal standard front width, whereby a disk drive is accommodated in each of the sections and the disk drives are respectively mounted flat and offset relative to one another on the vertically arranged common carrier plate with at least one of the two disk drives being spaced from the front panel. The improvement is that the disk drives are arranged offset relative to one another, as seen in the direction of the depth of the assembly, so that a space is created between the inside of the front panel and a surface of the rearmost disk drive facing toward the front panel and the space is arranged offset and spaced from a front panel in which space connecting lines both for the first disk drive as well as for the second disk drive can be arranged so that the connecting lines outgoing from the disk drives point in opposite directions and in that the connecting lines are conducted to plug-type connectors that are secured in that part of the front panel facing toward the disk drives that are arranged offset.

The invention is based on the perception that it would be uneconomical to provide a separate assembly for each of the two disk drives, as shall be explained below.

The backside of the building block system is usually occupied by a wiring backplane that, for example, contains a system bus or a multi-bus for connecting the assemblies to one another. The assemblies are also supplied with power proceeding from the backplane. The data lines and power supply lines of a commercially obtainable disk drive are generally not compatible with the data lines and power supply lines of the building block system and must therefore be conducted out at the front side of the assembly. Plug-type connectors that are secured in the front panel are preferred for this purpose.

An assembly having at least two sections would then be required for a single moving head disk drive, i.e., an assembly having at least twice the height or twice the width. An area that corresponds to somewhat less than a section is required at the front side of the assembly for the slot for the input and output of recording media such as, for example, diskettes. The data and power supply terminals of a moving head disk drive are usually located at the backside thereof, and a second section is required for corresponding plug-type connectors in the front panel of the assembly.

The space in the assembly behind the plug-type connectors then remains essentially unutilized.

Although one assembly having only one section is adequate in an of itself for the accommodation of an individual hard disk drive for which only plug-type connectors in the front panel are required, a suitable assembly must be just as high in case the building block system is designed for a multiple of the minimal standard front height, for instance twice or three times the standard front height, so that space is also wasted in this case.

Compared thereto, a preferred exemplary embodiment of the invention supplies a combination of at least one moving head disk drive and at least one hard disk drive as required anyway in a great number of applications. The space available in the assembly can be optimally utilized with this combination in that the moving head disk drive plug-type connectors are secured in the front panel directly next to the hard disk drive plug-type connectors, whereby all external plug-type connectors lie in one section of the assembly with a hard disk drive. In that the disk drives are secured to the common carrier plate that can in turn be guided in guide rails of an assembly carrier, a structure that is very mechanically stable is obtained. The vertical mounting of the invention allows an optimum utilization of the space since only a few standard front widths are required. The plug-type connectors conducted to the outside increase the resistance to interference, particularly in view of the electromagnetic capability (EMC). The plug-type connectors also enable simple access to the drives and a simple possibility of connecting the disk drives to the outside environment.

When the assembly is installed in an assembly carrier with the disk drives, the disk drives are shielded in terms of noise emission dependent on the shielding capability of the assembly carrier or, respectively, cause no interference with respect to the environment. A metallic carrier plate, for example of sheet aluminum, sees to a certain addition shielding within the assembly carrier. The carrier plate, however, can also be composed of materials such as, for example, Pertinax or stiff cardboard.

All operating and connecting elements of the disk drives are integrated in the front panel of the assembly, so that no modification of the backplane wiring is required given a use of the assembly in, for example, a multi-bus building block system or similar systems.

The inventive assembly largely employs the standard structural parts of building block systems and can therefore be cost-beneficially manufactured. No changes or modifications whatsoever need be undertaken in the building block system itself. The invention is suitable for different height, division and depth units of the building block system.

Other advantages and features of the invention will be readily apparent from the following description of the preferred embodiments, the drawings and claims.

DESCRIPTION OF THE PREFERRED EMBODIMENTS

Figure 1:
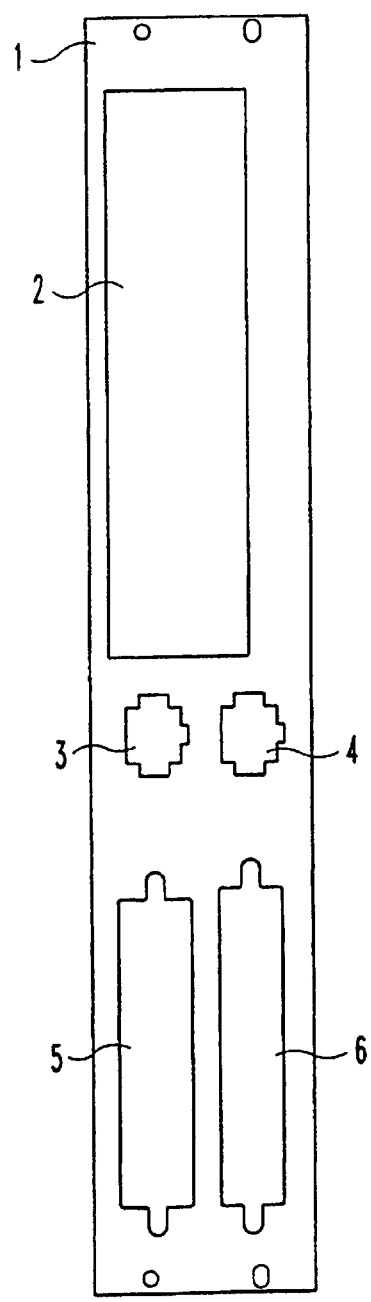
FIG. 1 is a front view of a front panel for an assembly having a moving head disk drive and a hard disk drive.

FIG. 1 shows a rectangular front panel 1 with a rectangular opening, aperture or clearance 2 for a floppy disk drive, two clearances or openings, 3, 4 for 6 power supply plug-type connectors and two clearances or openings 5, 6 for data line plug-type connectors.

Figure 2:
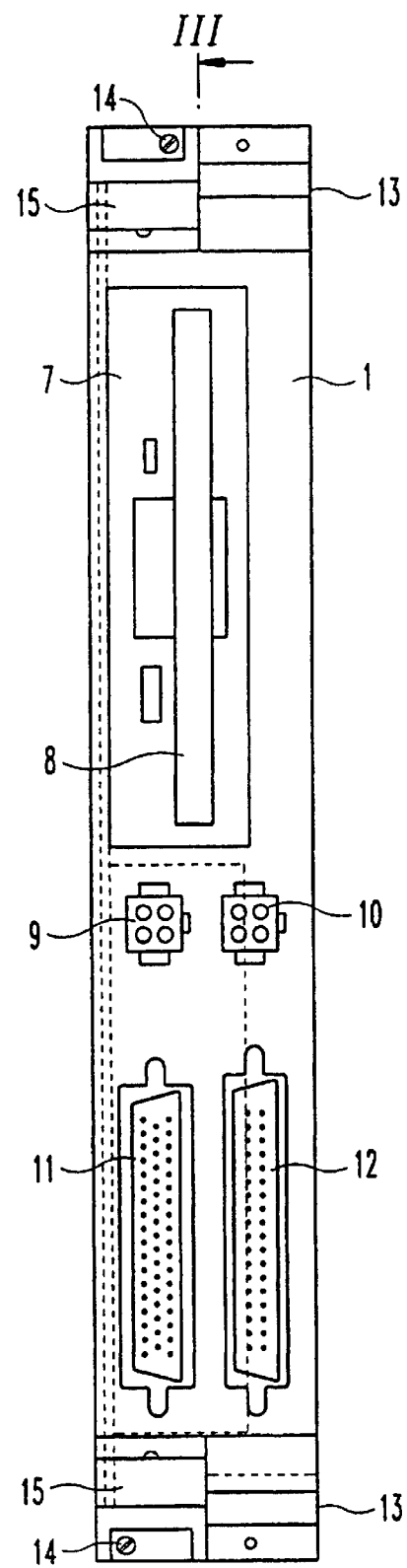
FIG. 2 is a view of the front panel of the complete assembly.

FIG. 2 shows a front view of an assembly with integrated disk drives, only a floppy disk drive 7 thereof being visible here, namely its front side with the diskette slot 8. Power supply plug-type connectors 9, 10 or, respectively, data line plug-type connectors 11, 12 are secured in the clearances 3 through 6. Two respective front panel holders 13 are located next to one another at the upper and lower edge of the front panel 1 for securing the panel in an assembly carrier (not shown) with fastening screws 14. A respective toggle lever 15 (also see FIG. 3) with whose assistance the assembly can be easily pulled from the assembly carrier is located at an upper or, respectively, lower front panel holder 13.

Figure 3:
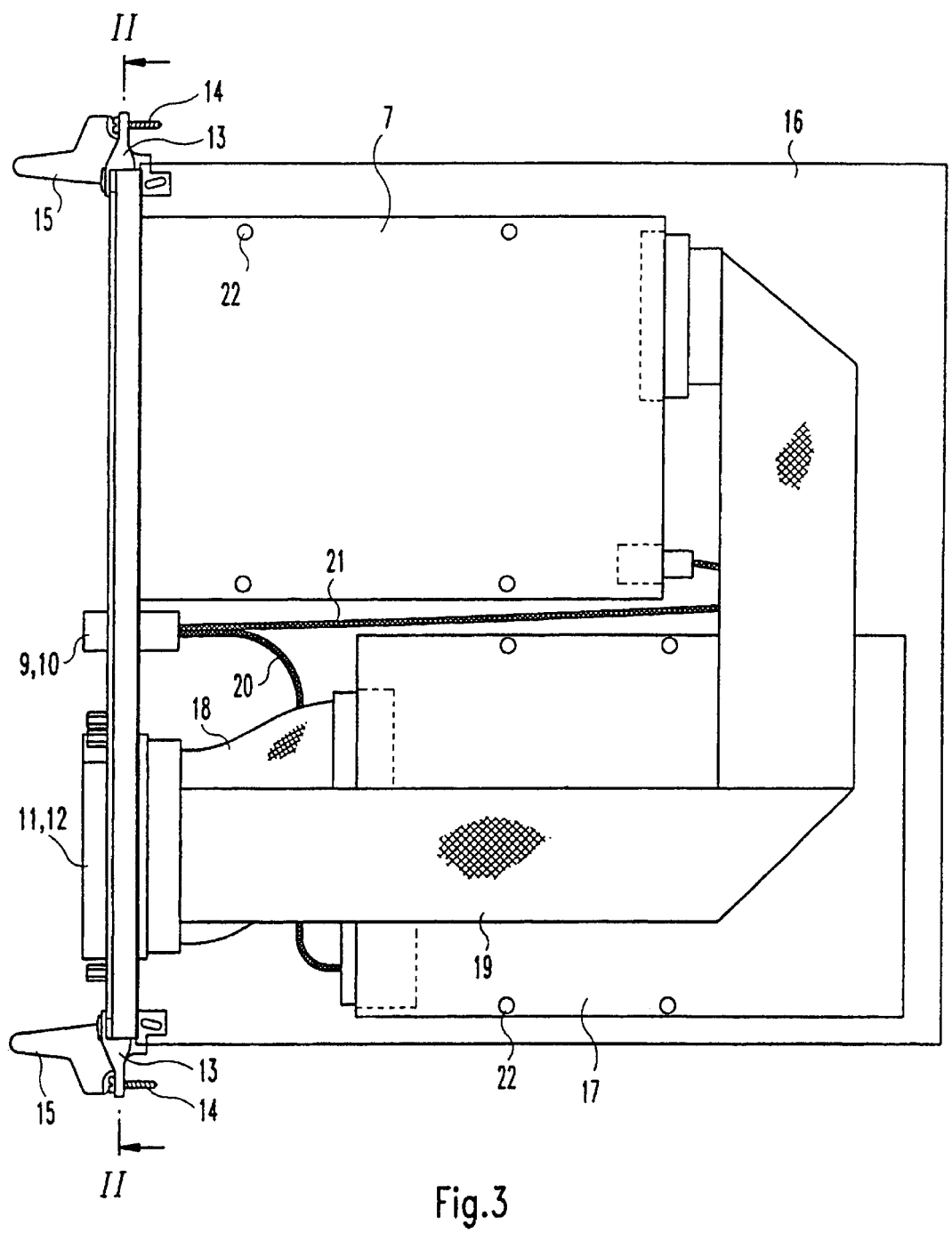
FIG. 3 is a side view of the assembly.

As shown in FIG. 3, a rectangular carrier plate 16 of aluminum that is secured to the front panel 1 extends behind the front panel 1 and perpendicular thereto. The diskette drive 7 is accommodated in the upper half of the carrier plate 16 or, respectively, in an upper section of the assembly, and the hard disk drive 17 is accommodated in the lower half of the carrier plate 16 or, respectively, in a lower section of the assembly. The power supply plug-type connectors 9, 10 and the data line plug-type connectors 11, 12 also lie in this lower section of the assembly.

As shown, the diskette drive 7 and the hard disk drive 17 are mounted offset relative to one another, whereby their data and power supply terminals integrated in the device point in mutually opposite directions. The data terminals of the hard disk drive 17 are directed toward the front panel 1 and are connected by a short ribbon cable 18 to the data line plug-type connectors 11 lying there opposite in the front panel 1. The data terminals of the diskette drive 7 are connected by a longer ribbon cable 19 to the data line plug-type connector 12 in the front panel 1. The ribbon cable 19 can be cleanly laid, for example at the side of the hard disk drive 17 opposite the carrier plate 16, as shown, or can be placed around the hard disk drive 17 or between the two drives 7, 17. The power supply terminals of the diskette drive 7 and of the hard disk drive 17 are connected by suitably laid power supply lines 20 and 21 to the power supply plug-type connectors 9 or, respectively, 10 in the front panel 1.

The width of the carrier plate 16 in FIG. 3 or, respectively, (depth when viewed proceeding from the front panel 1) corresponds to the standard depth of standard, inch-based assembly carriers. The height of the carrier plate 16 corresponds to a front height of the assembly carrier of 264 mm or six height units, i.e., to twice the minimum standard front height. Both drives 7, 17 are screwed directly to the carrier plate 16 with screws 22.

As can be seen in FIG. 3, the carrier plate 16—due to the offset arrangement of the drives 7, 17—offers enough but not excessively much space for the various terminals and connecting lines, so that the existing space in the assembly is optimally utilized. Nonetheless, the assembly is very simply constructed and all components are easily accessible. The assembly is also ergonomical, particularly because of the internally laid connecting lines.

In a further exemplary embodiment that is not shown in the drawing, the assembly carrier that is employed has a height of nine height units and the carrier plate is correspondingly higher, so that, for example, it offers space for two hard disk drives and a diskette drive, which are arranged above one another in this case.

In another embodiment that is likewise not shown and that does not fall within claim 1, the assembly carrier employed has a height of three height units and a corresponding carrier plate is only half as high as the carrier plate 16 in FIG. 3. In such a case, the front panel is to be selected twice as wide as the front panel 1 in FIG. 1 or 2. The carrier plate, for example, is centrally secured to the front panel, whereby a respective disk drive can be secured on each side of the carrier plate.

These last two embodiments can also be combined with one another, so that, for example, four or six disk drives can be accommodated in an assembly in a space-saving way. Due to this adaptability, a space-saving assembly having two or more disk drives can often also be manufactured in building block systems that are based on other basic dimensions than the inch-based building block system that has been described.

What is claimed is:

1. An assembly for a building block system, said assembly comprising a first section having a first disk drive and a second section having a second disk drive, each section having a standard front width and a standard front height, said sections having a common front panel having a front height at least equal to a standard front height of the sections and a front width at least equal to a standard front width of the section, said front panel having a plug-type connector for each of the disk drives in the second section, a common carrier plate extending vertically from the front panel and a connector line for each of the disk drives, each disk drive having a back side with a connector, said disk drives being mounted flat and offset relative to one another on the vertically-arranged common carrier plate with an offset being in the direction of the depth of the assembly and the back sides facing in opposite directions with the first disk drive being adjacent the front panel and the second disk drive having the back side facing the front panel and being spaced therefrom to form a space for the connector lines, said connector lines outgoing from the connectors on the back sides of the disk drives in opposite directions and extending in said space to extend to the connectors on said front panel.

2. An assembly according to claim 1, wherein the first disk drive is a moving head disk drive and the second disk drive is a hard disk drive.

3. An assembly according to claim 2, wherein the front panel has a clearance for changing record mediums for the moving head disk drive and the plug-type connectors for an external connection being provided in the front panel in the section of the assembly in which the hard disk drive is accommodated.

4. An assembly according to claim 1, wherein the plug-type connectors are power supply-type connectors.

5. An assembly according to claim 1, wherein the plug-type connectors are data line plug-type connectors.

6. An assembly according to claim 5, which includes power supply-type connectors being arranged on the front panel adjacent to the first-mentioned plug-type connectors and power lines connecting said power supply-type connectors to connectors disposed on the back side of each disk drive.

7. An assembly according to claim 1, which is composed of only the first section and the second section.

8. An assembly according to claim 7, wherein the front height of the assembly corresponds to twice the standard front height of the sections and the front width of the assembly corresponds to the standard front width of the sections and wherein the first disk drive and the second disk drive are secured to one side of the carrier plate.

9. An assembly according to claim 7, wherein the front height of the assembly corresponds to the standard front height of the sections and the front width of the assembly corresponds to twice the standard front width of the sections and wherein the first disk drive and the second disk drive are secured to mutually opposite sides of the carrier plate.

10. An assembly according to claim 1, wherein the carrier plate is configured for the acceptance in guide rails in an assembly carrier of the building block system.

11. An assembly according to claim 10, wherein the carrier plate is a metal plate.

12. An assembly according to claim 1, wherein the standard front height is approximately 132 mm and the standard front width is approximately 40.64 mm.

13. An assembly according to claim 1, wherein at least one of the disk drives is a diskette drive.

14. An assembly according to claim 1, wherein the first disk drive is a moving head disk drive, the first section of the front panel has an opening for changing recording medium for the moving head disk drive, the plug-type connectors are power supply-type connectors and are provided in the front panel in the second section, and which assembly includes data line-type connectors being provided in said second section of the front panel being connected by data lines extending to the back side of each of said disk drives.

* * * * *